(12) United States Patent
Kenworthy et al.

(10) Patent No.: US 8,766,095 B2
(45) Date of Patent: Jul. 1, 2014

(54) IGNITION LEAD

(75) Inventors: Michael Thomas Kenworthy, Jacksonville, FL (US); Shekhar Shripad Kamat, Saint Augustine, FL (US)

(73) Assignee: Unison Industries, LLC, Jacksonville, FL (US)

( * ) Notice: Subject to any disclaimer, the term of this patent is extended or adjusted under 35 U.S.C. 154(b) by 267 days.

(21) Appl. No.: 13/316,852

(22) Filed: Dec. 12, 2011

(65) Prior Publication Data

US 2013/0146325 A1 Jun. 13, 2013

(51) Int. Cl.
  *H01B 7/20* (2006.01)
(52) U.S. Cl.
  USPC .................................. 174/106 R; 174/102 R
(58) Field of Classification Search
  USPC ......... 174/15.1, 15.6, 102 A–102 D, 113 AS, 174/102 R, 106 R
  See application file for complete search history.

(56) References Cited

U.S. PATENT DOCUMENTS

| | | | |
|---|---|---|---|
| 2,028,793 A | 1/1936 | Mascuch | |
| 3,634,606 A * | 1/1972 | Iyengar | 174/106 D |
| 3,667,506 A | 6/1972 | Jocteur | |
| 3,991,397 A * | 11/1976 | King | 338/214 |
| 4,190,088 A * | 2/1980 | Lalikos et al. | 138/126 |
| 4,677,418 A * | 6/1987 | Shulver | 338/214 |
| 4,970,488 A * | 11/1990 | Horiike et al. | 338/214 |
| 6,684,621 B1 | 2/2004 | Johnson | |
| 7,124,724 B2 | 10/2006 | Fleetwood | |
| 7,637,094 B2 | 12/2009 | Costello et al. | |
| 2006/0180111 A1 | 8/2006 | Fleetwood | |
| 2010/0180569 A1* | 7/2010 | Beutin et al. | 60/39.821 |

FOREIGN PATENT DOCUMENTS

GB    677656 A    8/1952

OTHER PUBLICATIONS

Dag Bjorklof, "Shielding for EMC", Compliance Engineering, http://www.ce-mag.com/99ARG/Bjorklof137.html, 1999.
"EMI Shielding Theory", CHOMERICS, US Headquarters TEL +(1) 781-935-4850, http://www.chomerics.com/products/documents/emicat/pg192theory_of_emi.pdf, date prior to Dec. 12, 2011.
European Search Report for counterpart EP12195295, Mar. 27, 2013.

* cited by examiner

*Primary Examiner* — Angel R Estrada
*Assistant Examiner* — Dimary Lopez Cruz
(74) *Attorney, Agent, or Firm* — McGarry Bair PC

(57) ABSTRACT

An ignition lead in an engine for conducting a large current and high voltage ignition pulse from an exciter to an igniter, which may then transform the pulse received from the ignition lead into an electrical spark, which ignites a fuel and air mixture in the combustor of the engine. The ignition lead may include a construction for improved electromagnetic shielding.

18 Claims, 5 Drawing Sheets

IGNITION LEAD

BACKGROUND OF THE INVENTION

Contemporary reciprocating and gas turbine aircraft engines include ignition systems having an ignition lead that conducts a large current, high voltage ignition pulse from an exciter to an igniter, which may then transform the pulse received from the ignition lead into an electrical spark, which ignites a fuel and air mixture in a combustor of the engine. The conductor or inner lead wire of the ignition lead is often surrounded by one or more metallic braided sleeves and/or hermetic conduits for protection, ground return, and the prevention of electromagnetic interference. Installation and attachment of the braided sleeve may be labor intensive. The braided sleeve may cause interference with cooling air flow that is delivered through the conduit to the igniter terminal and may be prone to sustaining mechanical damage in severe vibratory environments. Furthermore, in some air-cooled applications, the braided sleeve has also been known to trap debris, which may ultimately obstruct the intended cooling air supply and may require additional design features to support the braiding and maintain well defined cooling flow paths.

BRIEF DESCRIPTION OF THE INVENTION

In one embodiment, an ignition lead for coupling an exciter to an igniter includes a center conductor for conducting high voltage from the exciter to the igniter, a conduit surrounding the center conductor and protecting the center conductor from the surrounding environment, and an electrical return path comprising a continuous layer of conductive material affixed to the conduit.

In another embodiment, an ignition lead for coupling an exciter to an igniter includes a center conductor for conducting high voltage from the exciter to the igniter, and a conduit formed from a wound, multi-layer strip having at least a first continuous metal layer and a second continuous metal layer, with the first and second continuous metal layers having different radio frequency shielding properties. Wherein the first and second continuous metal layers surround the center conductor and protect the center conductor from the surrounding environment and one of the first and second continuous metal layers provides an electrical return path.

DESCRIPTION OF EMBODIMENTS OF THE INVENTION

Figure 1A:
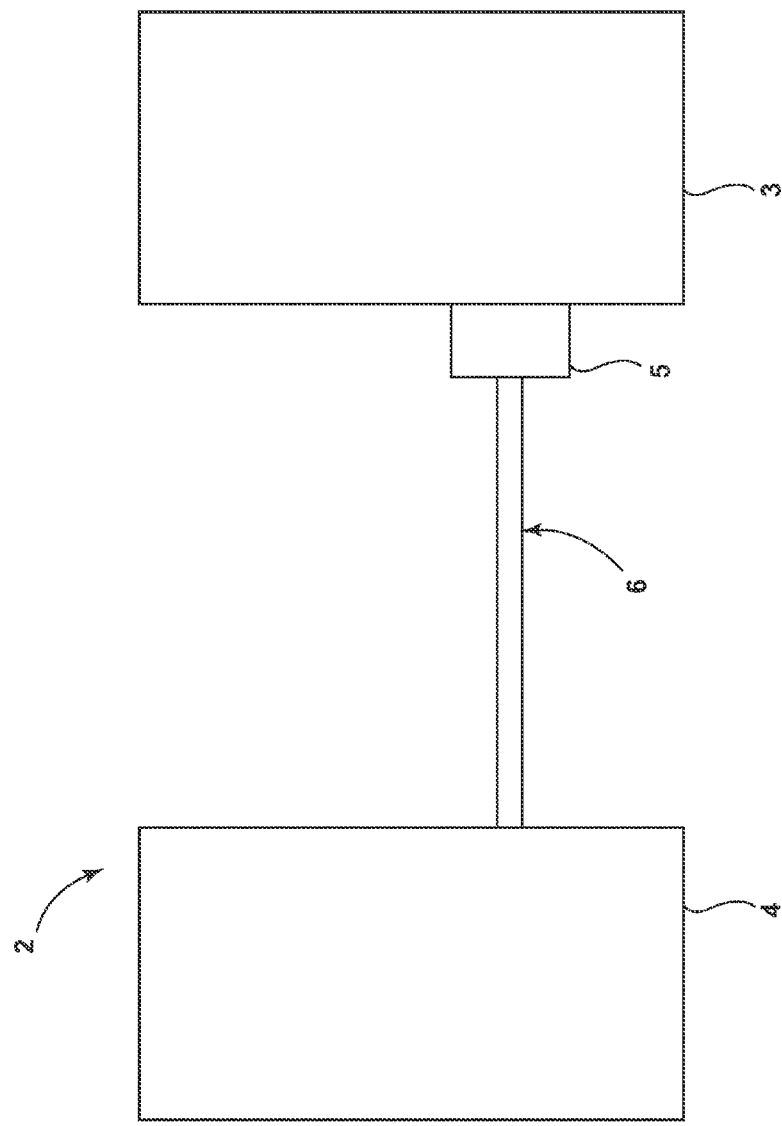
FIG. 1A is a schematic illustration of an ignition system having an ignition lead known in the prior art.
Figure 1B:
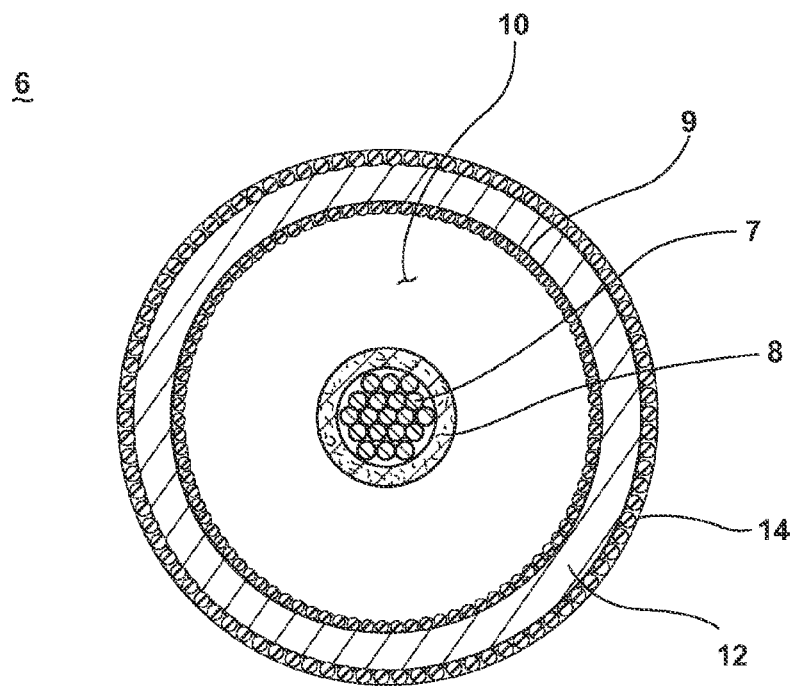
FIG. 1B is a cross-sectional view of the ignition lead of FIG. 1A.

FIG. 1A is a schematic illustration of an exemplary ignition system 2 that may be used with a gas turbine engine 3 and may include an exciter 4, at least one igniter 5, and at least one ignition lead 6 coupled between the exciter 4 and igniter 5. As illustrated in FIG. 1B, the ignition lead 6 may generally include a coaxial construction for electromagnetic shielding purposes. An inner portion may include a center conductor 7 for providing the ignition pulses, an electrically insulating jacket 8, and a low-resistance braid 9 used as a return path for the electrical current. The insulating jacket 8 may be formed from any suitable material including an elastomeric or polytetrafluoroethylene-based (PTFE) material. For example, by way of further non-limiting example silicone may be used to form the insulating jacket 8. The braid 9 may be spaced from the insulating jacket 8 by an air passage 10. This inner portion may then be surrounded by a flexible non-collapsible metal conduit 12, which may provide the ignition lead 6 with suitable structural integrity to maintain the air passage 10. The braid 9 may be brazed at each end of the ignition lead 6 to the conduit 12. A nickel-based overbraid 14 may be provided over the conduit 12 to protect the internal components of the ignition lead 6 from abrasion and other damage as well as provide added EMI protection.

Figure 1C:
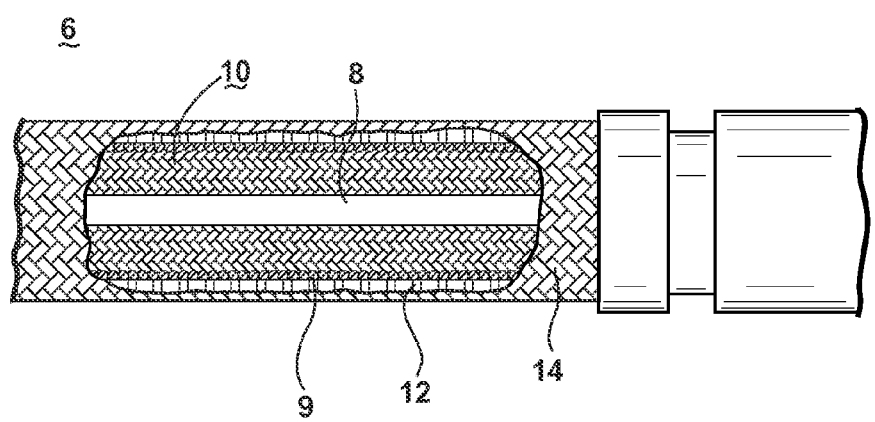
FIG. 1C is a side view of the ignition lead of FIG. 1A with a portion cutaway for illustrative purposes.
Figure 1D:
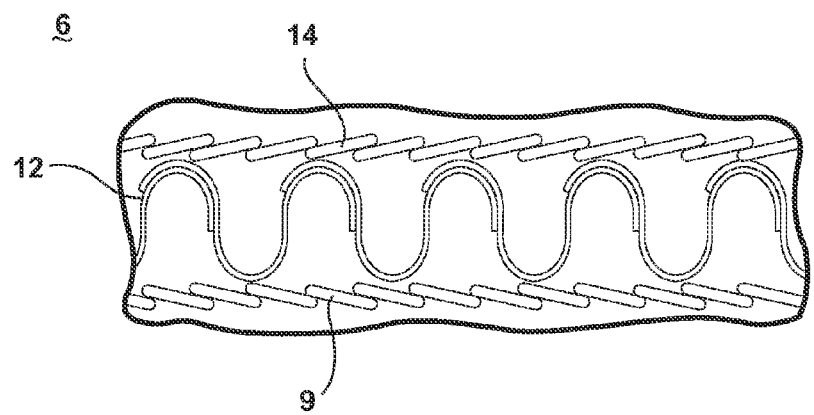
FIG. 1D is a cross-sectional view of a portion of the ignition lead of FIG. 1A.

FIG. 1C illustrates a side view of the ignition lead 6 with a portion cutaway to show the interior of the ignition lead 6. As more clearly illustrated in FIG. 1D the conduit 12 may be formed by a series of strip-wound and brazed convolutions. Alternatively, seam-welded or seamless corrugations are also used in some cases. The conduit 12 may provide mechanical and environmental protection for the center conductor 7 and generally requires the use of iron based alloys with good strength but relatively poor conductivity. The poor conductivity is addressed by including the low-resistance braid 9, which may often be formed from copper or other conductive metal that is applied to the convolutions forming the conduit 12 and acts as the current return path. The braid 9 may also provide additional EMI protection.

During operation of the ignition lead 6, air is able to flow through air passage 10 such that it cools the insulating jacket 8 as well as any other polymeric materials inside the igniter 5 and ignition lead 6. Locating the braid 9 within the conduit 12 may be advantageous because the conduit 12 helps protect the braid 9 from physical damage as well as electromagnetic interference. Over time vibration and other conditions may cause the braid 9 to internally sag, collapse, and/or bunch up, in which case the air passage 10 may become at least partially closed off, thus inhibiting air flow through the air passage 10, which may lead to high temperatures and thermal and/or dielectric breakdown of the insulating jacket 8.

Figure 2A:
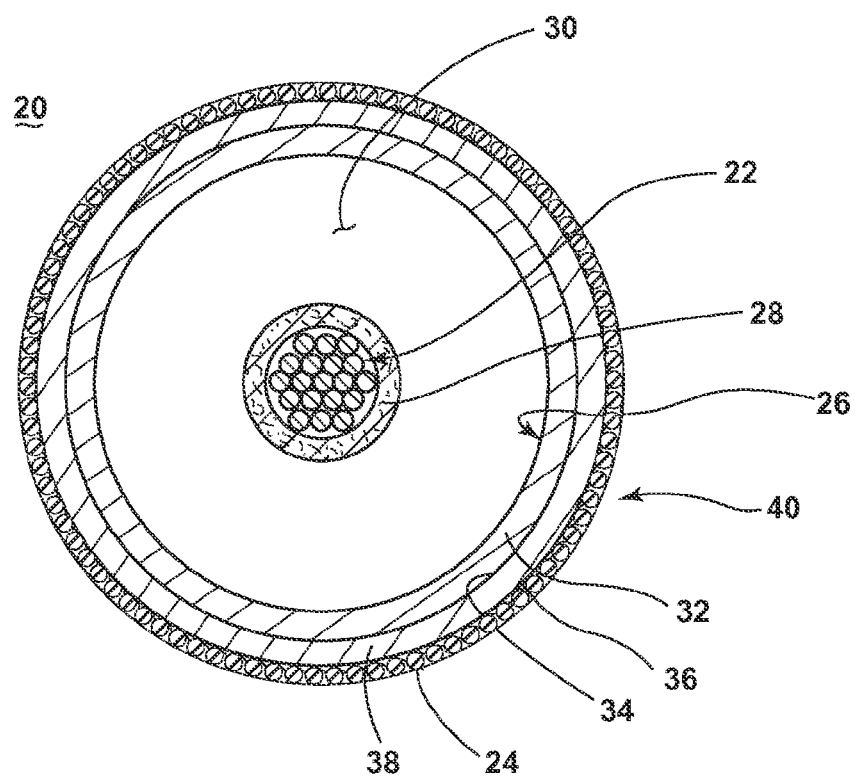
FIG. 2A is a cross-sectional view of an ignition lead according to the invention.

FIG. 2A illustrates an ignition lead 20 according to one embodiment of the invention. A center conductor 22, a conduit 24, and an electrical return path 26 may be included in the ignition lead 20. The center conductor 22 may conduct a high current and high voltage from the exciter to the igniter as described above. An electrical insulation jacket 28 may surround the center conductor 22 and may electrically isolate the center conductor 22 from the conduit 24 and the electrical return path 26.

The conduit 24 is illustrated as surrounding the center conductor 22 and protects the center conductor 22 from the surrounding environment provided by the jet engine, which may include a severe operating environment having high vibration and temperature extremes. The conduit 24 may form convoluted metal tubing around the center conductor 22. An air gap 30 may be formed by the conduit 24 relative to the center conductor 22 such that the center conductor 22 may be air-cooled. The electrical return path 26 may include a continuous layer 32 of conductive material affixed to the conduit 24. While the continuous layer 32 forming the electrical return path 26 is illustrated as being affixed to the interior surface 34 of the conduit 24 it is contemplated that the continuous layer 32 forming the electrical return path 26 may be affixed to either the outside surface 36 or the interior surface 34 of the conduit 24 or both the interior surface 34 and outside surface 36 simultaneously.

It is contemplated that the conduit 24 may include a first continuous metal layer 38 and that the continuous layer 32 forming the electrical return path 26 may include a second continuous metal layer. In such an instance, the second continuous metal layer forming the electrical return path 26 may be more conductive than the first continuous metal layer 38 forming the conduit 24 while the first continuous metal layer 38 may be less oxidative than the second continuous metal layer forming the electrical return path 26. In this manner, the conduit may be less likely to corrode and rust within the surrounding environment. By way of non-limiting example, the conduit 24 may be formed from a composition including an alloy of at least nickel and iron. The second continuous metal layer forming the electrical return path 26 may by way of non-limiting examples include copper or a composition including copper.

A chafe guard 40 may also be included in the ignition lead 20 and may surround the conduit 24. The chafe guard 40 may be included to provide additional mechanical protection to the ignition lead 20. By way of non-limiting examples the chafe guard 40 may be formed from a layer of polyetheretherketone (PEEK) braiding or a layer of PTFE spiral wrap. It is also contemplated that a nickel braid (not shown) may be included surrounding the conduit 24 and that the chafe guard 40 may be in addition to the nickel braid.

During manufacturing, the continuous layer 32 forming the electrical return path 26 may be affixed or attached to the conduit 24 in any suitable manner. By way of non-limiting example the continuous layer 32 may be achieved through plating a continuous metal layer such as copper or a composition including copper on the first continuous metal layer 38. By way of further non-limiting examples, the continuous layer may be achieved through electroplating, hydroforming, bilayer rolling, physical vapor deposition, chemical vapor deposition, brush painting, and spray painting.

It is contemplated by way of a further non-limiting example, that the first and second continuous layers may alternatively be formed from a bimetal strip. During manufacturing, such a bimetal strip may be formed into the conduit 24 and electrical return path 26. This may be done in any suitable manner including by way of non-limiting examples that the bimetal strip may be helically wound to form the conduit 24 and electrical return path 26 and that the bimetal strip may be formed into convolutions. The portions of the bimetal strip may be joined together by brazing such that a brazed joint 42 may be formed. In this manner, the conduit 24 and electrical return 26 may be formed from a wound, multilayer strip having at least a first continuous metal layer and a second continuous metal layer. It is also contemplated that a trimetal strip may be used and that in this manner a chafe guard may also be formed using the trimetal strip.

Figure 2B:
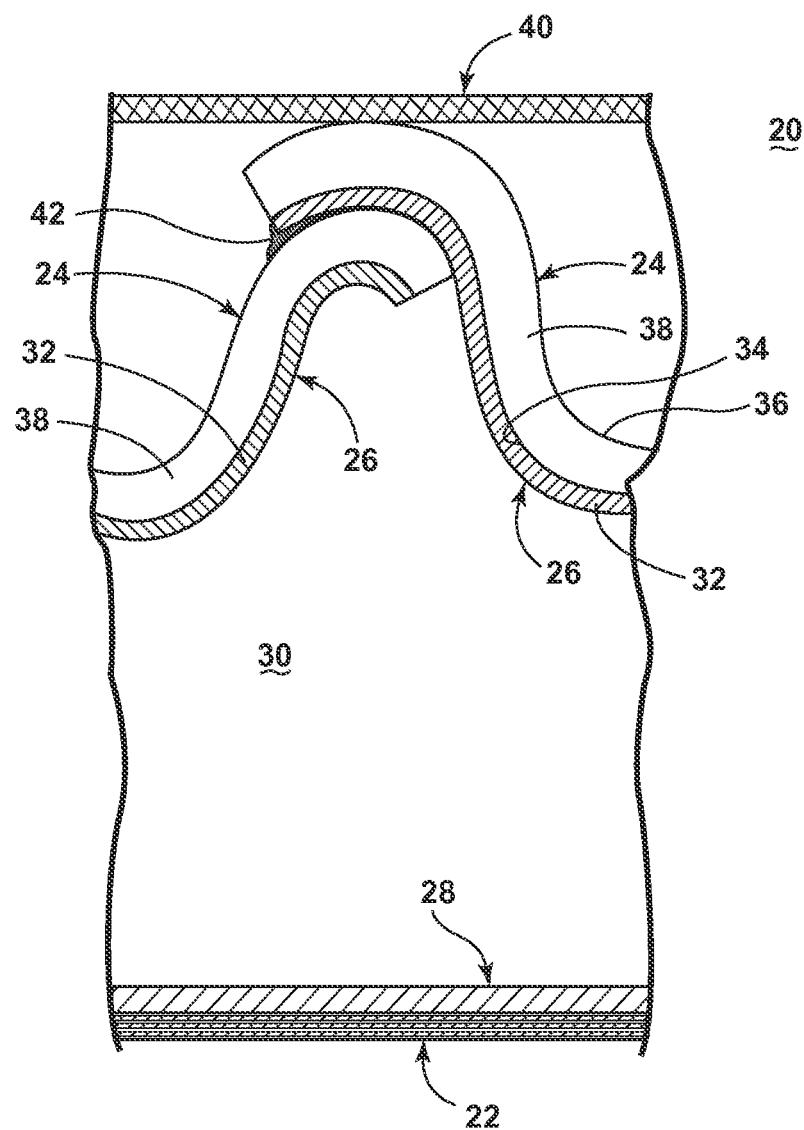
FIG. 2B is a schematic cross-sectional view of a portion of the ignition lead shown in FIG. 2A.

As shown more clearly in FIG. 2B, it is contemplated that the conduit 24 may be formed such that it has a corrugated configuration and may be flexible. It is contemplated that the continuous layer 32 forming the electrical return path 26 is thin enough to be flexible and not inhibit flex of the conduit 24. This may be true regardless of how the conduit 24 and electrical return path 26 are formed as it is contemplated that the bimetal strip may also be flexible. While, the continuous layer 32 may appear broken in this illustration it will be understood that the continuous metal forming the electrical return path 26 is helically wrapped and is indeed continuous.

It is contemplated that the first and second continuous metal layers may have different shielding properties to enhance the EMI shielding and RFI shielding to protect the ignition lead 20. By way of non-limiting example the first and second continuous metal layers may have different radio frequency shielding properties. By way of non-limiting example, that continuous layer 32 may be better at magnetic field reflection while the first continuous metal layer 38 may be better at absorption loss across the whole frequency range. By way of an additional non-limiting example the first continuous metal layer may shield frequencies up to 40 GHz, and the second continuous metal layer may shield frequencies in the range of 10 kHz to 10 GHz.

The above described embodiments provide a variety of additional benefits including that the ignition lead may be a flexible, environmentally sealed, and shielded assembly with reduced complexity. The above described embodiments eliminate the inner braid, which results in a variety of benefits as a solid conductor is used instead of the stranded conductor formed by conventional sleeving, mesh, or overbraid. For example, improved mechanical robustness and superior shielding relative to the metal braid may be realized as the braid is a relatively fragile design element and any sort of opening or seam within the braid is a potential radiation emission leak path. The elimination of the braid and the use of a thin continuous conductive layer may also provide a reduced envelope and a reduction in weight, which may provide an advantage during operation of the aircraft. The elimination of the braid also results in the elimination of labor intensive processes during manufacture.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An ignition lead for coupling an exciter to an igniter, the ignition lead comprising:
   a center conductor for conducting high voltage from the exciter to the igniter;
   a conduit surrounding the center conductor and protecting the center conductor from a surrounding environment; and
   an electrical return path comprising a continuous layer of conductive material affixed to the conduit:
   wherein the conduit comprises a first continuous metal layer and the continuous layer comprises a second continuous metal layer.

2. The ignition lead of claim 1 wherein the conduit forms an air gap relative to the center conductor.

3. The ignition lead of claim 1 wherein the continuous layer is affixed to one of an outside surface and an inside surface of the conduit.

4. The ignition lead of claim 1 wherein the second continuous metal layer is more conductive than the first continuous metal layer.

5. The ignition lead of claim 4 wherein the first continuous metal layer is less oxidative than the second continuous metal layer.

6. The ignition lead of claim 5 wherein the first continuous metal layer comprises a composition of at least Nickel and Iron, and the second continuous metal layer comprises a composition having at least copper.

7. The ignition lead of claim 1 wherein the first and second continuous layers are formed from a bimetal strip.

8. The ignition lead of claim 7 wherein the bimetal strip is wound.

9. The ignition lead of claim 7 wherein the bimetal strip is formed into convolutions.

10. The ignition lead of claim 7 wherein the bimetal strip is flexible.

11. The ignition lead of claim 1, further comprising an electrical insulation jacket surrounding the center conductor and electrically isolating the center conductor from the conduit and the electrical return path.

12. The ignition lead of claim 11, further comprising a chafe guard surrounding the conduit.

13. An ignition lead for coupling an exciter to an igniter, the ignition lead comprising:
 a center conductor for conducting high voltage from the exciter to the igniter; and
 a conduit formed from a wound, multi-layer strip having at least a first continuous metal layer and a second continuous metal layer, with the first and second continuous metal layers having different radio frequency shielding properties;
 wherein the first and second continuous metal layers surround the center conductor and protect the center conductor from a surrounding environment and one of the first and second continuous metal layers provides an electrical return path.

14. The ignition lead of claim 13 wherein the conduit forms an air gap relative to the center conductor.

15. The ignition lead of claim 13 wherein the one of the first and second continuous metal layers providing the electrical return path is located between the other of the first and second continuous layers and the center conductor.

16. The ignition lead of claim 15, further comprising an electrical insulation jacket surrounding the center conductor and electrically isolating the center conductor from the conduit and the electrical return path.

17. The ignition lead of claim 16, further comprising a chafe guard surrounding the conduit.

18. The ignition lead of claim 13 wherein the first continuous metal layer shields frequencies up to 40 GHz, and the second continuous metal layer shields frequencies in the range of 10 kHz to 10 GHz.

* * * * *